United States Patent
Cutler

(10) Patent No.: US 6,241,926 B1
(45) Date of Patent: *Jun. 5, 2001

(54) METHOD FOR MAKING AN EXPANDED POLYSTYRENE ARTICLE

(75) Inventor: Phil Cutler, Olympia, WA (US)

(73) Assignee: Future Foam Technology, LLC, Lacey, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,870

(22) Filed: May 7, 1999

(51) Int. Cl.⁷ .................................................. B29C 43/20
(52) U.S. Cl. ........................ 264/113; 264/45.4; 264/126; 264/321
(58) Field of Search ................................. 264/45.1, 46.4, 264/45.4, 321, 113, 126

(56) References Cited

U.S. PATENT DOCUMENTS

| | | | | |
|---|---|---|---|---|
| 3,534,129 | * | 10/1970 | Bartel | 264/46.4 |
| 3,935,044 | * | 1/1976 | Daly | 264/45.4 |
| 5,252,270 | * | 10/1993 | Haardt et al. | 264/45.4 |
| 5,298,208 | * | 3/1994 | Sibley et al. | 264/45.4 |
| 5,466,405 | * | 11/1995 | Viertel et al. | 264/45.4 |
| 5,601,766 | * | 2/1997 | Viertel et al. | 264/45.4 |
| 5,699,561 | * | 12/1997 | Broersma | 264/45.4 |
| 5,718,968 | | 2/1998 | Cutler et al. | |

* cited by examiner

Primary Examiner—Allan R. Kuhns
(74) Attorney, Agent, or Firm—Brian J. Coyne

(57) ABSTRACT

A mold assembly and method for molding a substantially hemispherical construct from pre-expanded polystyrene beads. The mold assembly includes a female half mold; a mating male half mold; a first male mold insert mountable on the male half mold and having a continuous, peripheral, beveled edge; and a second male mold insert mountable on the first male mold insert. For forming a construct having an impact-resistant exterior layer and an energy-absorbing interior layer, such as a motorcyclist safety helmet, the beads are initially molded under heat and compression between the female half mold and the first insert to form a first intermediate product of a first volume having a continuous, peripheral, beveled edge; said product is thereafter molded under heat and compression between the female half mold and the second insert to a second, reduced volume to form a compressed, second intermediate product, the beveled edge of the first intermediate product serving to uniformly distribute the force applied thereto. The second intermediate product is then remolded to the same volume to improve volume stability, and thereafter backfilled between the male half mold and the female half mold with additional pre-expanded polystyrene beads to form an energy-absorbing inner layer.

5 Claims, 18 Drawing Sheets

METHOD FOR MAKING AN EXPANDED POLYSTYRENE ARTICLE

BACKGROUND OF THE INVENTION

1. Field of the Invention

This invention relates generally to expanded polystyrene constructs having a high-impact resistance and strength without an unacceptable increase in brittleness, and a method for making the same. More particularly, this invention relates to such constructs that are created by a molding process that includes, as an intermediary step, the imparting of a cam or beveled edge surface to the construct preparatory to compressing the construct to high density. The beveled edge surface imparted to the construct serves to uniformly distribute the forces applied during the compression step even over relatively large angular deviations from the mold parting line, thereby permitting the molding of a single large construct that formerly, prior to this invention, would have required the molding and combining of several smaller, partial constructs. Thus, the disclosed method is particularly useful in the molding of polystyrene motorcyclist and bicyclist safety helmets and polystyrene shipping boxes such as those commonly used for shipping iced fish. This invention also provides molding apparatus adapted for molding constructs of the type described.

2. Background Art

A method for molding an expanded, highly impact-resistant, polystyrene construct from polystyrene beads was disclosed in U.S. Pat. No. 5,718,968 to P. W. Cutler et al., which by this reference is incorporated herein. The polystyrene beads include a thin outer shell of polystyrene and a hollow interior that includes a blowing agent, such as pentane, for example. According to the method, the beads were first pre-expanded by application of heat through hot air or steam, which caused the blowing agent to vaporize and expand the beads. The beads were then cooled, which caused the beads to have reduced internal pressure. The pre-expanded beads were next placed into a mold assembly where they were subjected to heat and pressure for molding to a first volume. The molded article was then rapidly cooled in the mold assembly, thereby causing the vaporized blowing agent within the beads to condense and create a pressure less than atmospheric inside the beads. Thereafter, the molded product with beads having low internal pressure was immediately subjected to compression within the mold assembly to a second volume, less than the first volume. This resulted in a single layer construct that had memory shape and was particularly suited for acoustic and thermal insulation. Alternatively, additional layers were molded within the mold assembly by adding beads to the first molding step and then molding together the originally-molded layer with the additional beads. This yielded a layered construct wherein each layer had a different density than the other layers and each layer had a density higher than the density of the beads from which it was molded, except when a last layer was a backfill layer of density equal to that of the beads from which it was molded. The layered construct was volume stable, high density, high strength, and highly impact resistant.

When this method was used to mold a safety helmet for a motorcyclist or bicyclist, the outermost layer had the highest density, while inner layers had lower densities to absorb impact forces to minimize transmission of these forces through the construct. Such a helmet, being substantially hemispherical and having a 360 degree circumference, was thought to require molding in at least five parts—crown, front, back, and two sides— which thereafter were assembled together in a single mold and finally molded together. This was because it had been found that the compression process was less effective when the pressure is applied at angles between 46 degrees and 89 degrees to the parting line of the mold. It was theorized that compression pressure was diffused so that the compression ratio rapidly diminished with pressure applied at angles more than 45 degrees with respect to the parting line of the mold.

There remains a need, therefore, for a method and mold assembly for molding pre-expanded polystyrene beads that permits molding a substantially hemispherical polystyrene construct as a whole, in a single, integrated molding process, thereby eliminating the need for first molding two or more individual component parts thereof and the combining of the parts through an additional molding step. There also remains a need for expanded polystyrene constructs that are produced by the method and mold assembly described herein, which feature high impact resistance and strength without an unacceptable increase in brittleness, and which can be molded in substantially hemispherical shapes in a single, integrated molding process. These needs are fulfilled by the present invention.

SUMMARY OF THE INVENTION

A method and apparatus are provided for molding an expanded polystyrene bead construct within a mold assembly. The mold assembly includes a female half mold having a first, continuous, peripheral edge surface and an interior surface configured to impart a desired exterior surface to the construct. The mold assembly further includes a male half mold having a second, peripheral edge surface in mating alignment with the first peripheral edge surface when the female half mold and the male half mold are aligned on an alignment axis. The mold assembly also includes a first male mold insert that is mountable on the male half mold. When the male half mold, with the first male mold insert mounted thereon, is inserted into the female half mold, the space between the female half mold and the first male insert defines a first volume. The mold assembly also includes a second male mold insert, mountable on the first male mold insert, such that when the male half mold, with the first and second male mold inserts mounted thereon, is inserted into the female half mold, the space between the female half mold and the second male mold insert defines a second volume, which is less than the first volume. The first male mold insert has a third, beveled, continuous edge surface for engaging an outer, peripheral portion of the pre-expanded polystyrene beads that are to be molded within the mold assembly, and to which portion it imparts a beveled edge. Preferably the beveled edge surface of the first male mold insert is deviated at least 45 degrees, but not more than 60 degrees, from a mold parting line normal to the alignment axis. In a preferred embodiment, for mounting the second male mold insert over the first male mold insert, the first male mold insert has a plurality of upstanding alignment pins and the second male mold insert has a plurality of second apertures in mating alignment with said alignment pins, and the female half mold similarly has a plurality of third apertures in mating alignment with said alignment pins.

In a first embodiment, the method includes filling the female half mold with pre-expanded polystyrene beads of a predetermined density; mounting the first male mold insert on the male half mold; molding the beads under applied heat and pressure by forcing the first male mold insert against the beads to fuse the beads together to form a first intermediate product of a first volume having a continuous, beveled edge surface formed between the beveled edge surface of the first male mold insert and the peripheral edge surface of the female half mold; rapidly cooling the fused first intermediate product to within a subplasticizing temperature temperature (usually between 160 and 180 degrees F.) to cause lower than atmospheric pressure within the beads of the first intermediate product; mounting the second male mold insert on the first male mold insert; and compressing the cooled first intermediate product between the second male mold insert and the female half mold to a second, reduced volume, before the low pressure conditions within the beads equilibrate to ambient conditions, to produce a single-layer, fused, expanded bead body of at least 200 percent higher density than the predetermined density of the pre-expanded beads. The reason for rapidly cooling the first intermediate product to wthin a plasticizing temperature range is so that the temperature of the intermediate product will be low enough to escape the post expansion that would follow if the termperature is too high and, at the same time, avoid the cell wall damage that would occur during the subsequent compression if the temperature is too low.

In a second embodiment, for molding a more volume-stabilized, single-layer, polystyrene bead construct, the method includes the preceding series of acts followed by the additional act of remolding the cooled intermediate product under heat and compression between the second male mold insert and the female half mold to a second, reduced volume, before the low pressure conditions within the beads equilibrate to ambient conditions, to produce a fused, expanded bead body of at least 200 percent higher density than the predetermined density of the pre-expanded beads.

In a third embodiment, for molding a layered, expanded polystyrene bead construct, the method includes filling the female half mold with pre-expanded polystyrene beads of a predetermined density; mounting the first male mold insert on the male half mold; molding the beads under applied heat and pressure by forcing the first male mold insert against the beads to fuse the beads together to form a first intermediate product of a first volume having a continuous, beveled edge surface formed between the beveled edge surface of the first male mold insert and the peripheral edge surface of the female half mold; rapidly cooling the fused first intermediate product to within a subplasticizing temperature range to cause lower than atmospheric pressure within the beads of the first intermediate product; mounting the second male mold insert on the first male mold insert; and compressing the cooled first intermediate product between the second male mold insert and the female half mold to a second, reduced volume, before the low pressure conditions within the beads equilibrate to ambient conditions, to produce a single-layer, fused, expanded bead body of at least 200 percent higher density than the predetermined density of the pre-expanded beads; removing the second male mold insert from the first male mold insert; and adding pre-expanded polystyrene beads to the mold assembly and remolding the added beads between the female half mold and the male half mold under heat and compression to cause fusion of the added beads at an interface to the expanded bead body to form a layered construct comprising at least two layers of beads wherein the beads have different densities. In a fourth embodiment, a backfilled, layered construct is molded by a method that includes filling the female half mold with pre-expanded polystyrene beads of a predetermined density; mounting the first male mold insert on the male half mold; molding the beads under applied heat and pressure by forcing the first male mold insert against the beads to fuse the beads together to form a first intermediate product of a first volume having a continuous, beveled edge surface formed between the beveled edge surface of the first male mold insert and the peripheral edge surface of the female half mold; rapidly cooling the fused first intermediate product to within a subplasticizing temperature range to cause lower than atmospheric pressure within the beads of the first intermediate product; mounting the second male mold insert on the first male mold insert; and compressing the cooled first intermediate product between the second male mold insert and the female half mold to a second, reduced volume, before the low pressure conditions within the beads equilibrate to ambient conditions, to produce a single-layer, fused, expanded bead body of at least 200 percent higher density than the predetermined density of the pre-expanded beads; remolding the cooled intermediate product under heat and compression between the second male mold insert and the female half mold to a second, reduced volume, before the low pressure conditions within the beads equilibrate to ambient conditions, to produce a fused, expanded bead body of at least 200 percent higher density than the predetermined density of the pre-expanded beads; removing the second male mold insert from the first male mold insert; and adding pre-expanded polystyrene beads to the mold assembly and remolding the added beads between the female half mold and the male half mold under heat and compression to cause fusion of the added beads at an interface to the expanded bead body to form a layered construct comprising at least two layers of beads wherein the layers have different densities. The latter embodiment of the method is particularly suited for molding substantially hemispherical constructs having a 360 degree circumferential edge, such as bicyclist and motorcyclist safety helmets, and packing crates.

DETAILED DESCRIPTION OF THE PREFERRED EMBODIMENT

Figure 1:
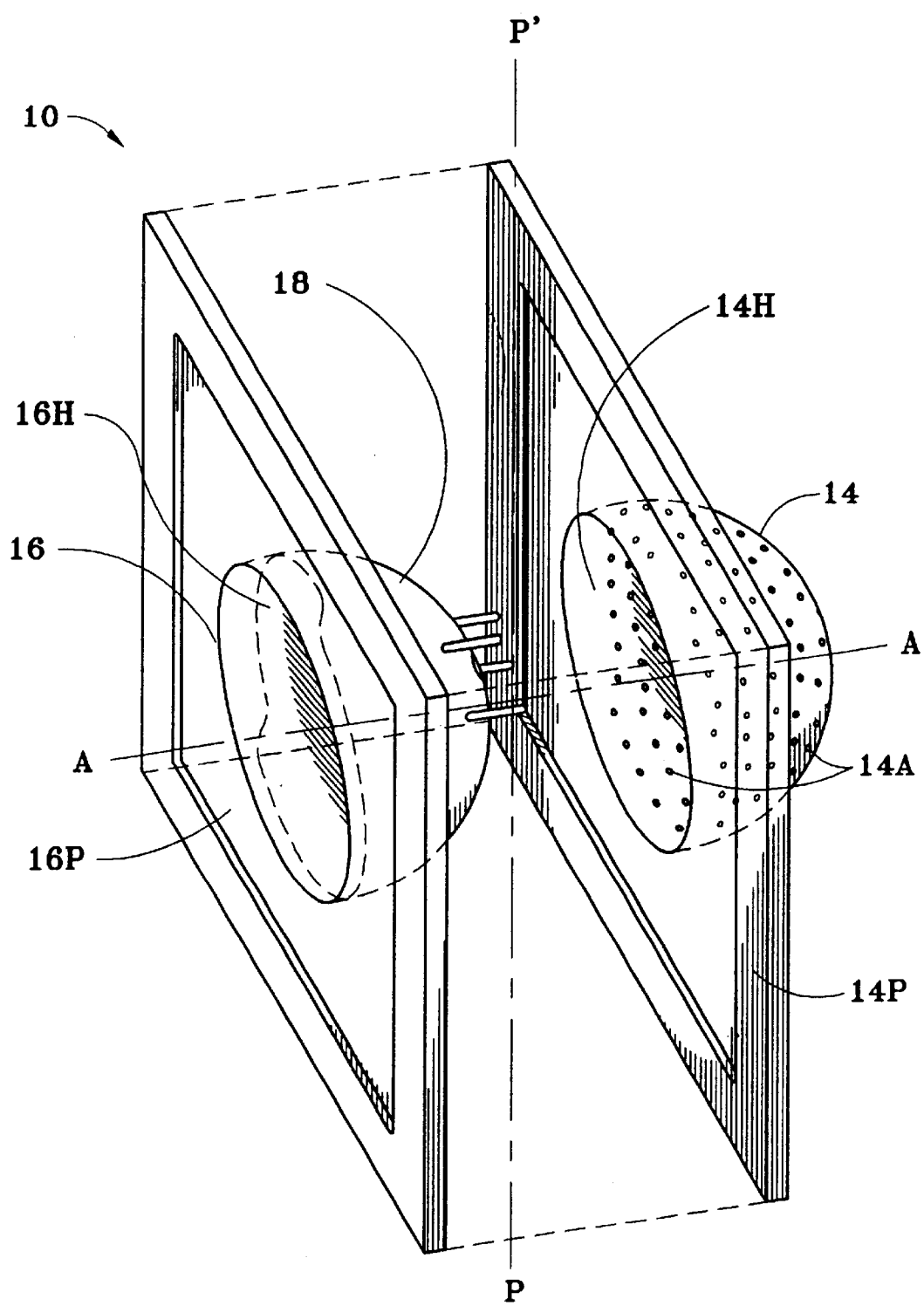
FIG. 1 is an exploded, perspective view of a mold assembly of an illustrative embodiment of the invention for molding a motorcyclist safety helmet, showing the male half mold, female half mold, and the first male mold insert thereof aligned on an alignment axis A—A.

Referring to FIG. 1, an illustrative embodiment of four component parts of a mold assembly, denoted generally by the numeral 10, for molding a motorcyclist safety helmet 12, are shown in exploded, perspective view—namely, a female half mold 14, a male half mold 16, a first male mold insert 18 placed over the male half mold 16; a second male mold insert 20, which is also part of the mold assembly 10, is insertable over the first male mold insert 18, as described below. All four components are aligned on an axis A—A. The female half mold 14 includes a flat plate portion 14P normal to axis A—A and a centrally disposed, substantially hemispherical portion 14H that extends axially away from the male half mold 16. The hemispherical portion 14H has an interior surface that is configured to impart a desired exterior surface to a mold construct for a motorcyclist safety helmet 12. The male half mold 16 has a flat plate portion 16P normal to axis A—A and a centrally disposed, substantially hemispherical portion 16H that extends axially towards the female half mold 14. A mold parting line P–P' is defined as any straight line normal to axis A—A and lying in a plane that contains apposed, engaged surfaces of plate portions 14P, 16P when the mold assembly 10 is in a closed position with the substantially hemispherical portion 16H of the male half mold 16 inserted inside of the substantially hemispherical portion 14H of the female half mold 14.

Figure 2:
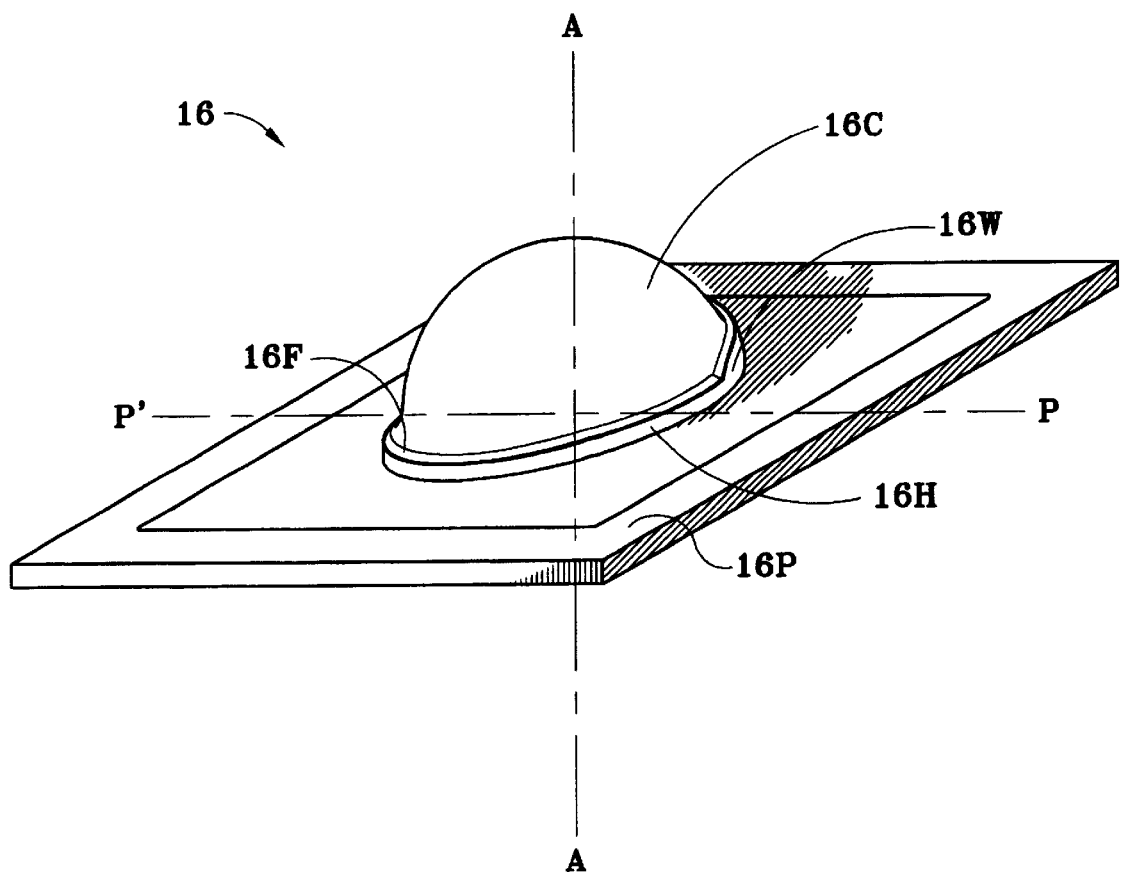
FIG. 2 is a perspective view of the male half mold thereof.
Figure 15:
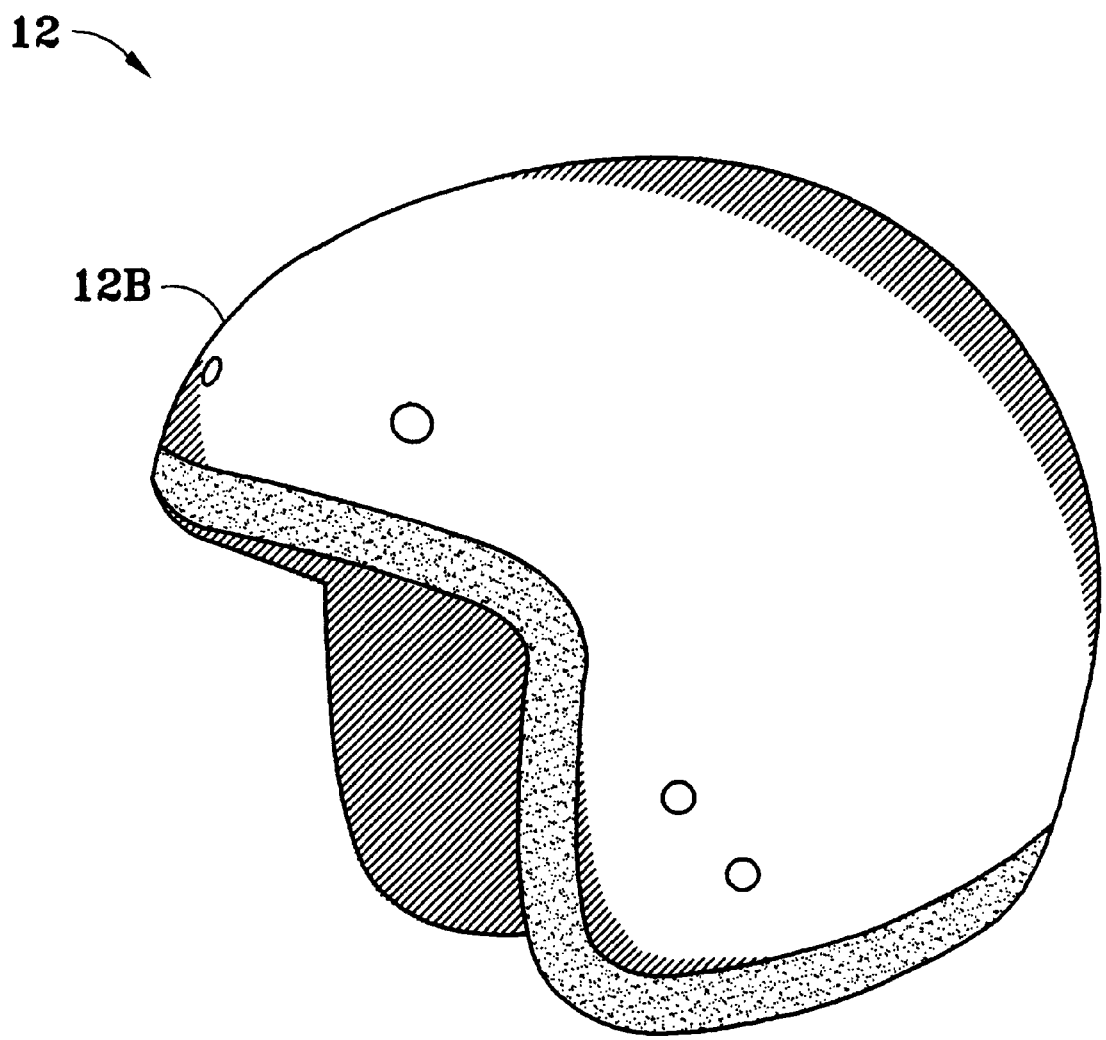
FIG. 15 is a perspective view of a motorcyclist safety helmet (visor removed) that incorporates a multilayer polystyrene construct molded on the mold assembly depicted in FIGS. 1–5.

Referring now to FIG. 2, the male half mold 16 is shown in enlarged, perspective view, removed from the remainder of the mold assembly 10. It may be seen that the male half mold 16 includes a convex, crown portion 16C integral with, and surrounded by, a peripheral, relatively narrow, upturned flange portion 16F, the narrow space between the flange portion 16F and the crown portion 16C defining a peripheral well 16W. The flange portion 16F is somewhat raised at the front relative to the sides and rear of the flange portion 16F, corresponding to the brow portion 12B of a motorcyclist safety helmet 12, depicted in FIG. 15, as molded on the illustrated mold assembly 10.

Figure 3:
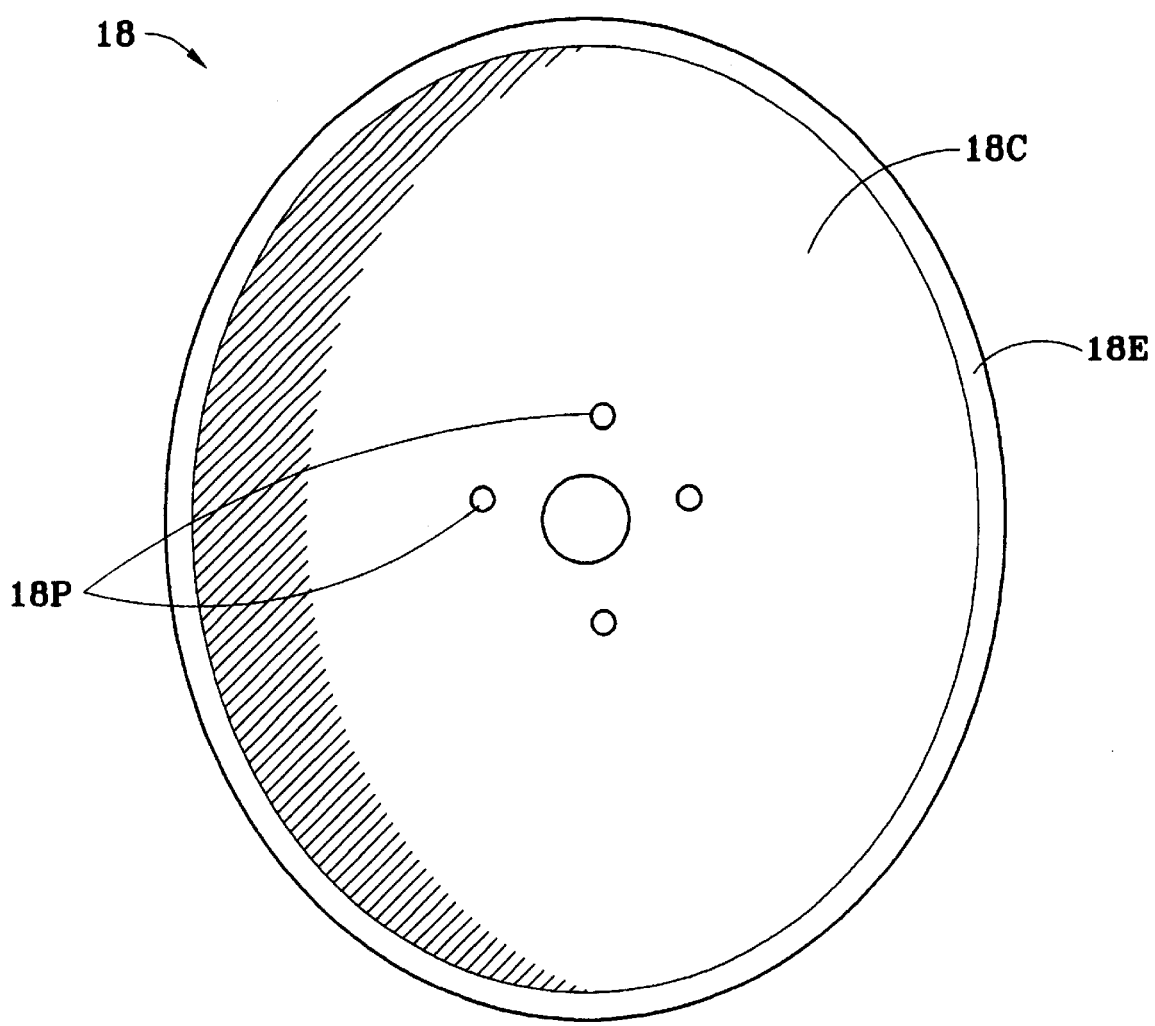
FIG. 3 is a top plan view of the first male mold insert thereof.
Figure 4:
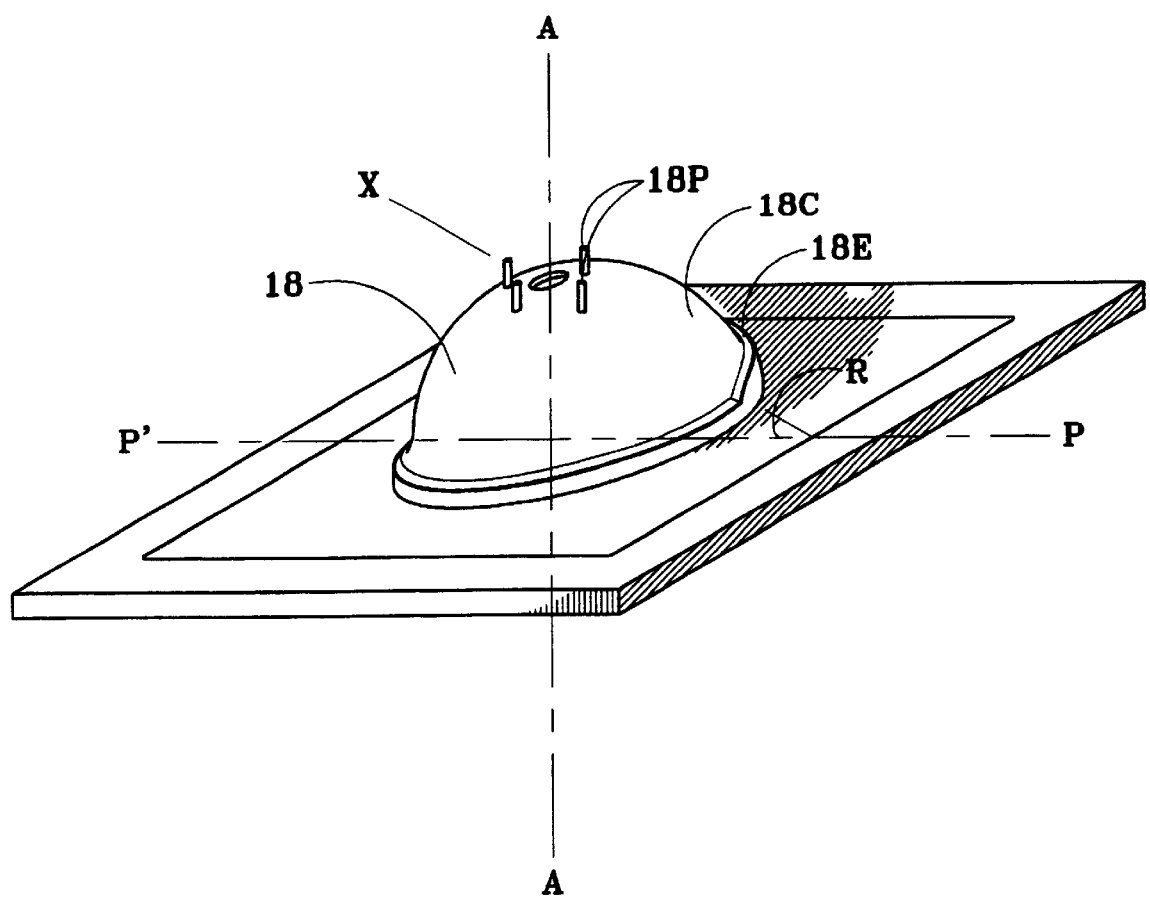
FIG. 4 is a perspective view of the first male mold insert mounted on the male half mold thereof.

Referring to FIG. 3, the first male mold insert 18 has a convex, crown portion 18C integral with, and surrounded by, a beveled, continuous peripheral edge 18E. Four alignment pins 18P, extend axially from the crown portion 18C and are configured for insertion into mating apertures 20A, 14A in the second male insert 20 and in the female half mold 14, respectively. The crown portion 18C and the edge 18E are sized and configured such that the insert 18 mounts snugly on the male half mold 16 with the edge 18E overlying the well 16W of the male half mold 16. As shown in FIG. 4, when the first male mold insert 18 is so mounted on the male half mold 16, the beveled edge 18E extends radially inward from the flange 16, and axially away from the mold parting line P–P' by angle R defined by a line OX tangent to the beveled edge 18E and the parting line P–P', where O is a peripherally-disposed point of intersection of said tangent line with the parting line P–P'. Preferably, R is between 45 and 60 degrees.

Figure 5:
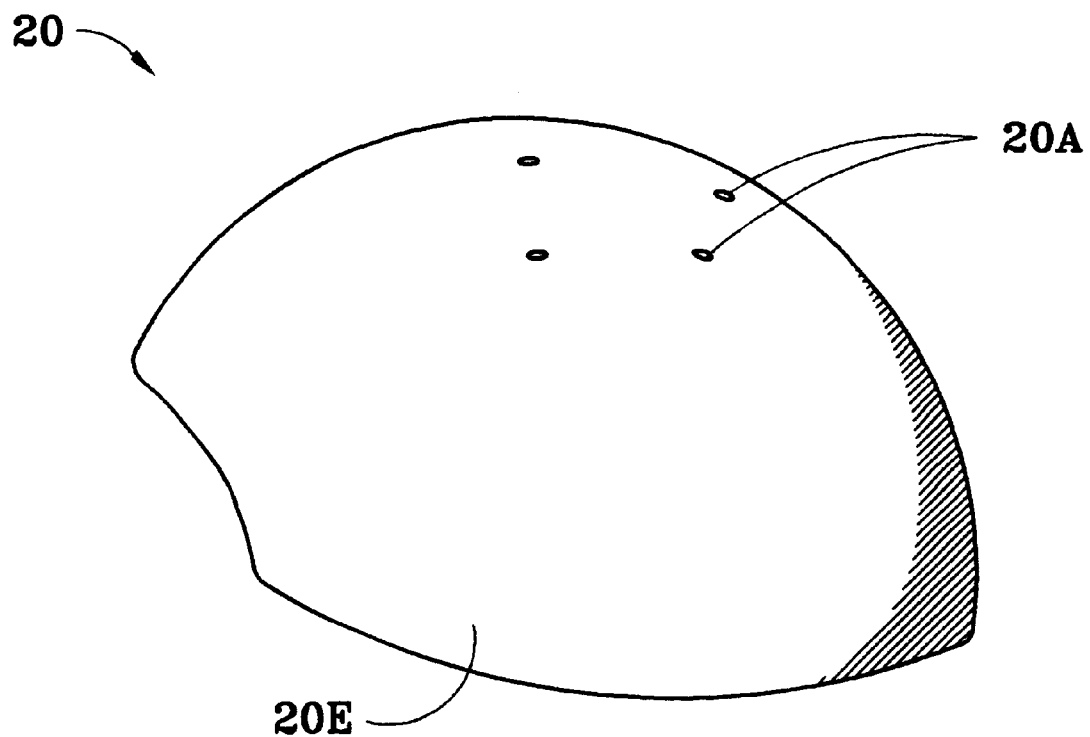
FIG. 5 is a perspective view of the second male mold insert thereof.
Figure 6:
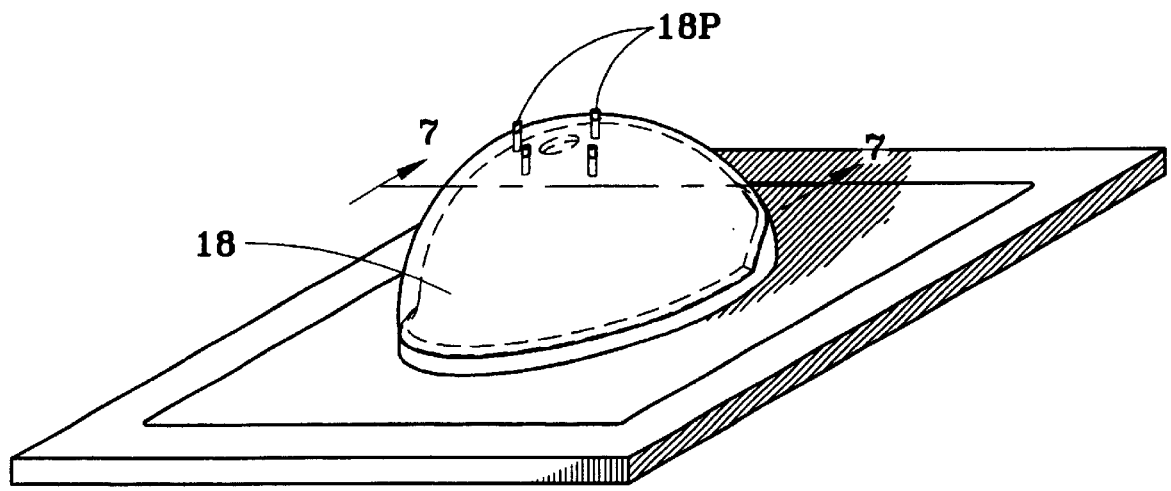
FIG. 6 is a perspective view of the second male mold insert mounted on the first male mold insert and male half mold thereof.
Figure 7:
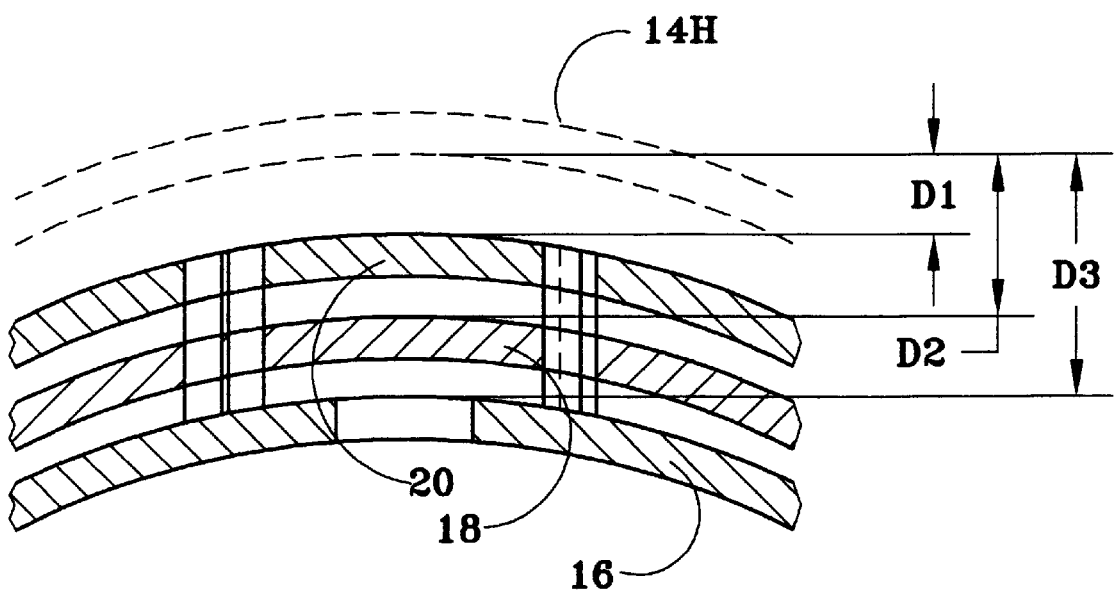
FIG. 7 is a fragmentary, cross-sectional view of a crown portion of said mold assembly in the configuration depicted in FIG. 6, taken along line 6—6 thereof, and of the hemispherical portion of the female half mold when the mold assembly is in a closed position.

FIG. 5 shows that the second mold insert 20 is substantially hemispherical and, unlike the male half mold 16 and the first male insert 16, has no peripheral flange or beveled edge. As shown in FIG. 6, the second mold insert 20 is sized and configured for mounting atop the first male mold insert 18 (shown in phantom). Thus, as shown in FIG. 7, when the mold assembly 10 is closed, the distance $D_1$, and hence the volume, between the substantially hemispherical portion 14H of the female half mold 14 and the second male mold insert is least; when the second mold insert 20 is removed and only the first male mold insert is mounted on the male half mold 16, the distance $D_2$, and hence the volume between portion 14H and the first male mold insert 18 is somewhat larger; and when both inserts 18, 20 are removed, the distance $D_3$, and hence the volume, between portion 14H and the male half mold 16 is the largest.

Figure 8:
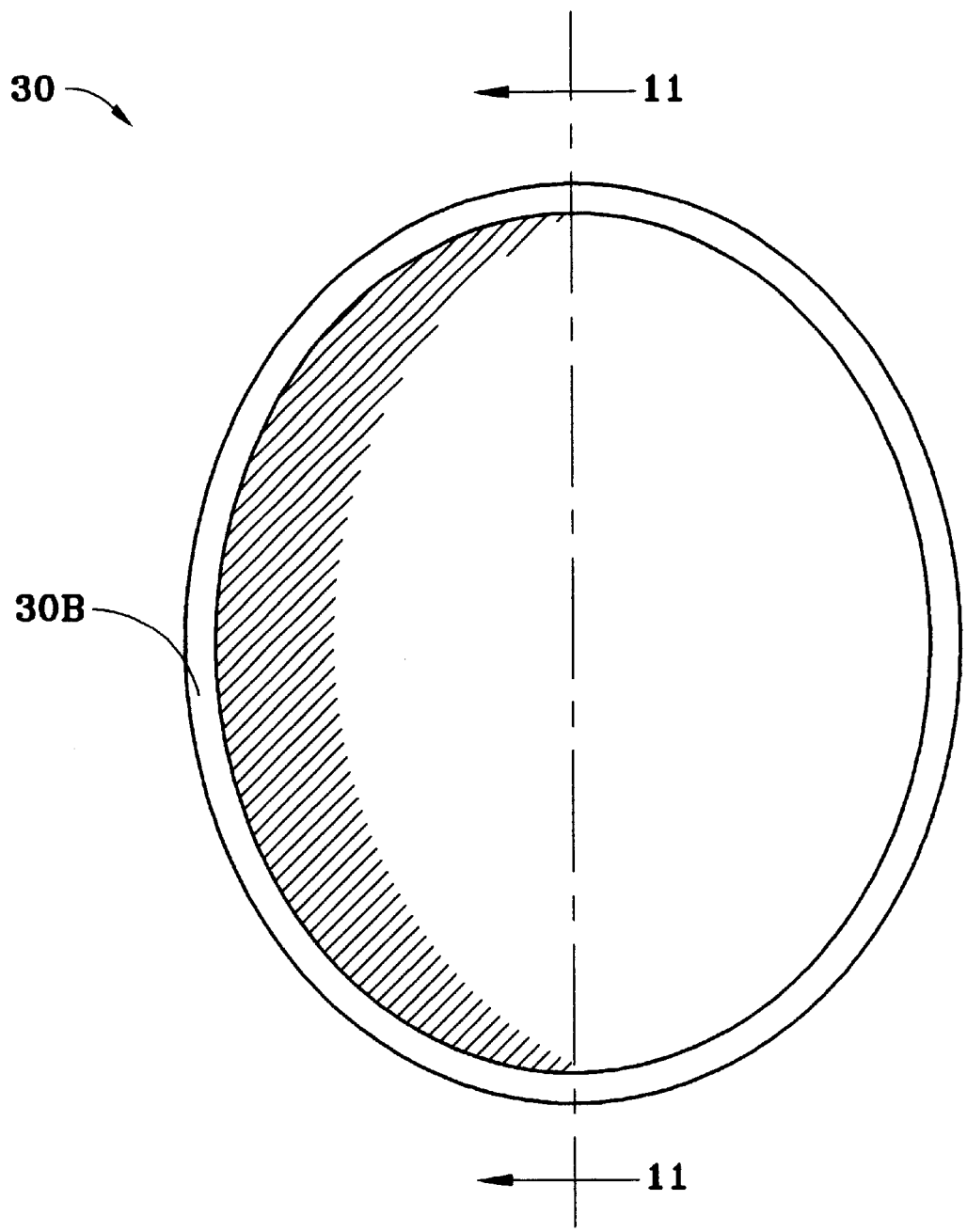
FIG. 8 is a bottom plan view of a first intermediate product molded between the female half mold and the first male mold insert of FIG. 1.
Figure 11:
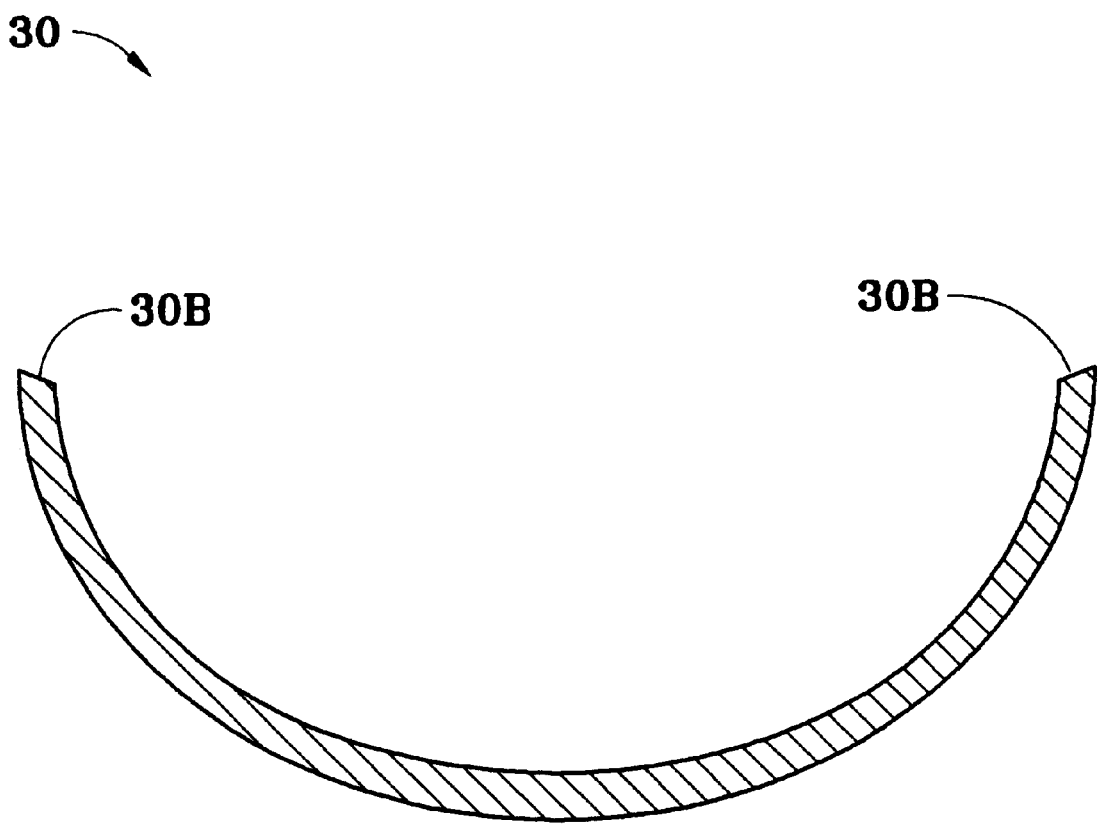
FIG. 11 is a cross-sectional view of the first intermediate product of FIG. 8 taken along line 11—11.

In use, for molding a motorcyclist safety helmet 12, the substantially hemispherical portion 14H of the female half mold 14 is filled with pre-expanded polystyrene beads (not shown) of a predetermined density. The first male mold insert 18 is mounted on the male half mold 16. Once filled, the mold is clamped shut. The beads are molded under applied heat and pressure by forcing the male mold insert against the beads to fuse the beads together to form a first intermediate product 32 of a first volume, depicted in FIGS. 8 and 11. Preferably, the molding is carried out at a pressure from about 9 to about 12 psi, and the product being molded is allowed to dwell at a temperature of from about 100 degrees C. to about 110 degrees C. for from about 15 to about 30 seconds. The first intermediate product 30 is then rapidly cooled by the introduction of water into the mold assembly. The first intermediate product 30 is allowed to dwell with the cooling water for a sufficient time to enable the blowing agent within the beads to once again liquefy, typically, less than 2 minutes, depending on the thickness of the molded part. The pressure is then relieved.

Figure 9:
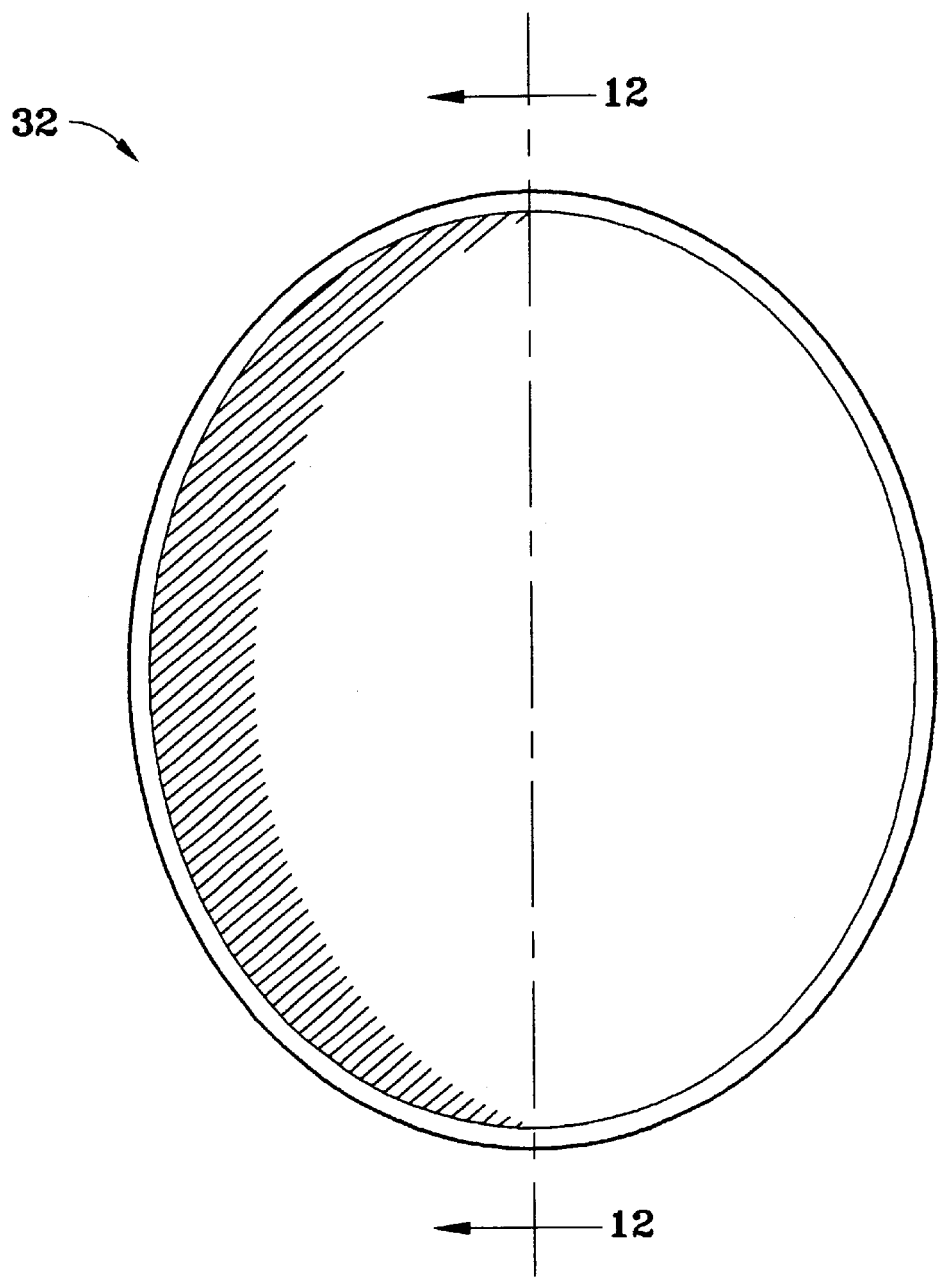
FIG. 9 is a bottom plan view of a second intermediate product molded from the first intermediate product by compression between the female half mold and the second male mold inserts of FIGS. 1–6.
Figure 10:
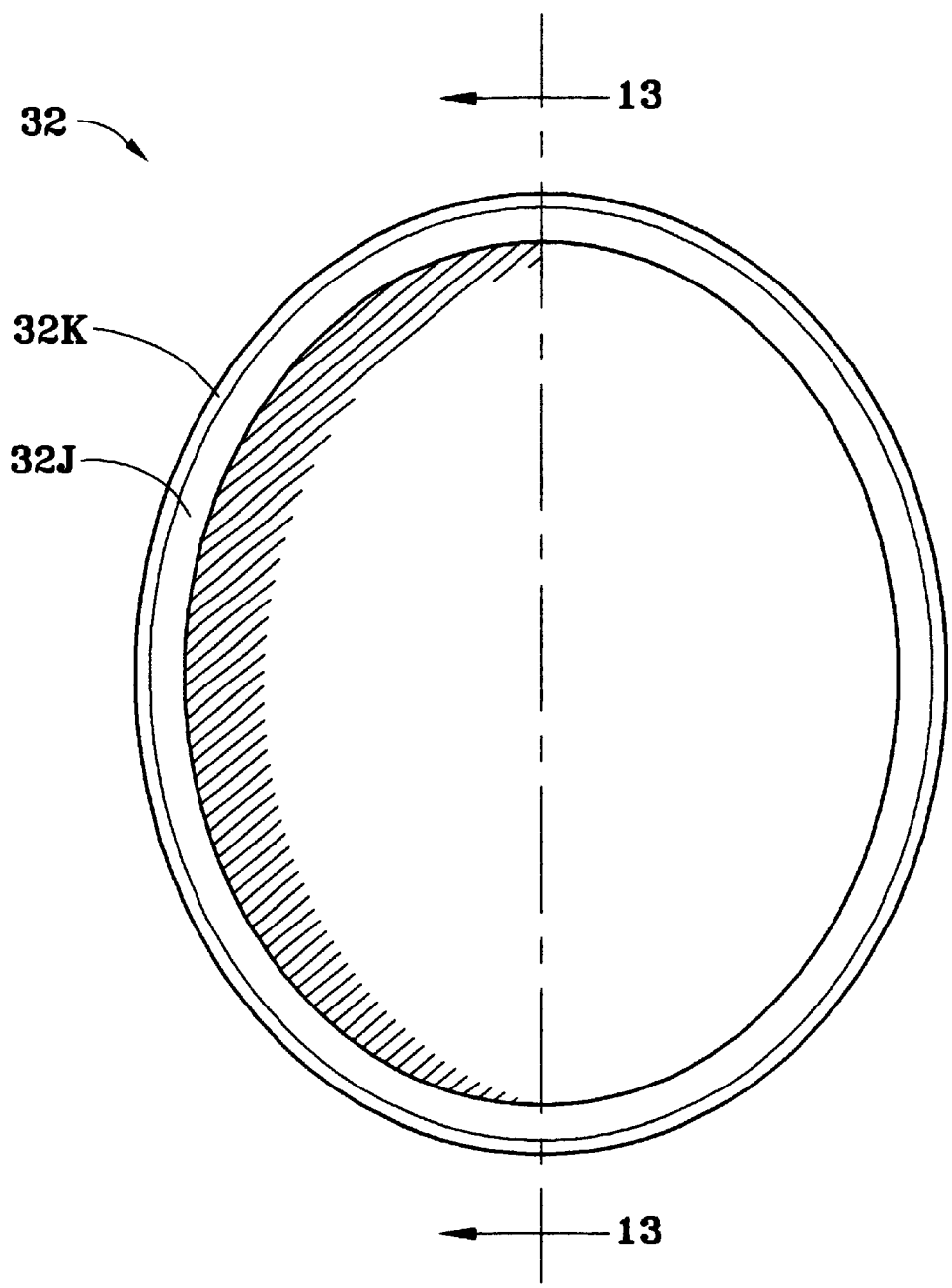
FIG. 10 is a bottom plan view of a backfilled construct formed from the second intermediate product between the female half mold and the male half mold of FIGS. 1–6 after removal of the first and second male mold insert from the male half mold.
Figure 12:
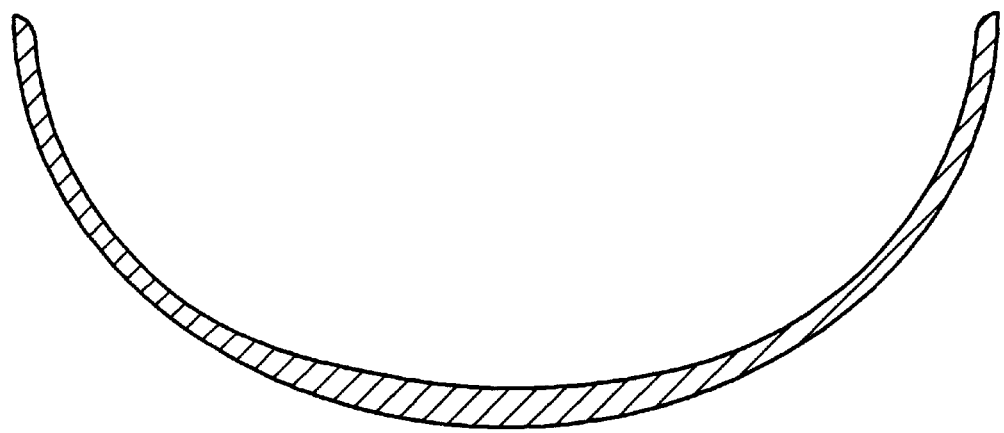
FIG. 12 is a cross-sectional view of the second intermediate product of FIG. 9 taken along line 12—12.
Figure 13:
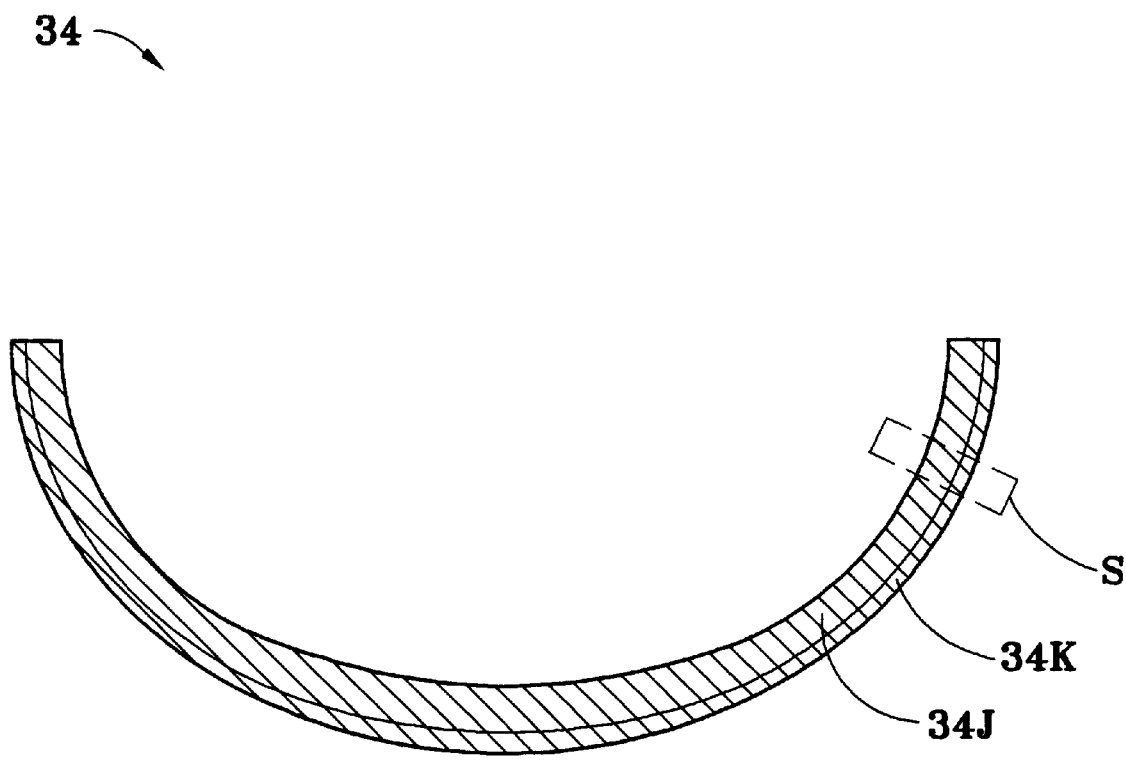
FIG. 13 is a cross-sectional view of the backfilled, layered construct of FIG. 10 taken along line 13—13.

With the first intermediate product 30 still within the female half mold 14, the second male mold insert 20 is mounted over the first male insert 18 with the alignment pins 18P inserted through the alignment apertures 20A, and the mold assembly 10 is closed. The first intermediate product 30 is substantially hemispherical, but has a continuous, beveled edge 30B, as may best be seen in FIG. 11. When the mold assembly 10 is in closed position, the peripheral edge 20E of the second mold insert 20 engages the beveled edge 30B of the first intermediate product 30. Thus, when next pressure is applied to the mold assembly 10 to compress the cooled first intermediate product 30 from a first volume to a second, lesser volume, the beveled edge 30B serves to uniformly distribute the force applied by the peripheral edge 20E. The mold assembly 10 is clamped shut during this step for at least 3 seconds. This operation produces a relatively thin, second intermediate product 32, depicted in FIGS. 9 and 12, which is a fused expanded bead body of at least 200 percent higher density than the predetermined density of the pre-expanded beads.

Next, the cooled, second intermediate product 32 is remolded under heat and compression between the second male insert 20 and the female half mold 14 to a second, reduced volume before the low pressure conditions within the beads equilibrate to ambient conditions; the remolded product is then cooled as before. This operation significantly increases the volume stability of the molded construct and results in a construct consisting of two layers.

Figure 14:
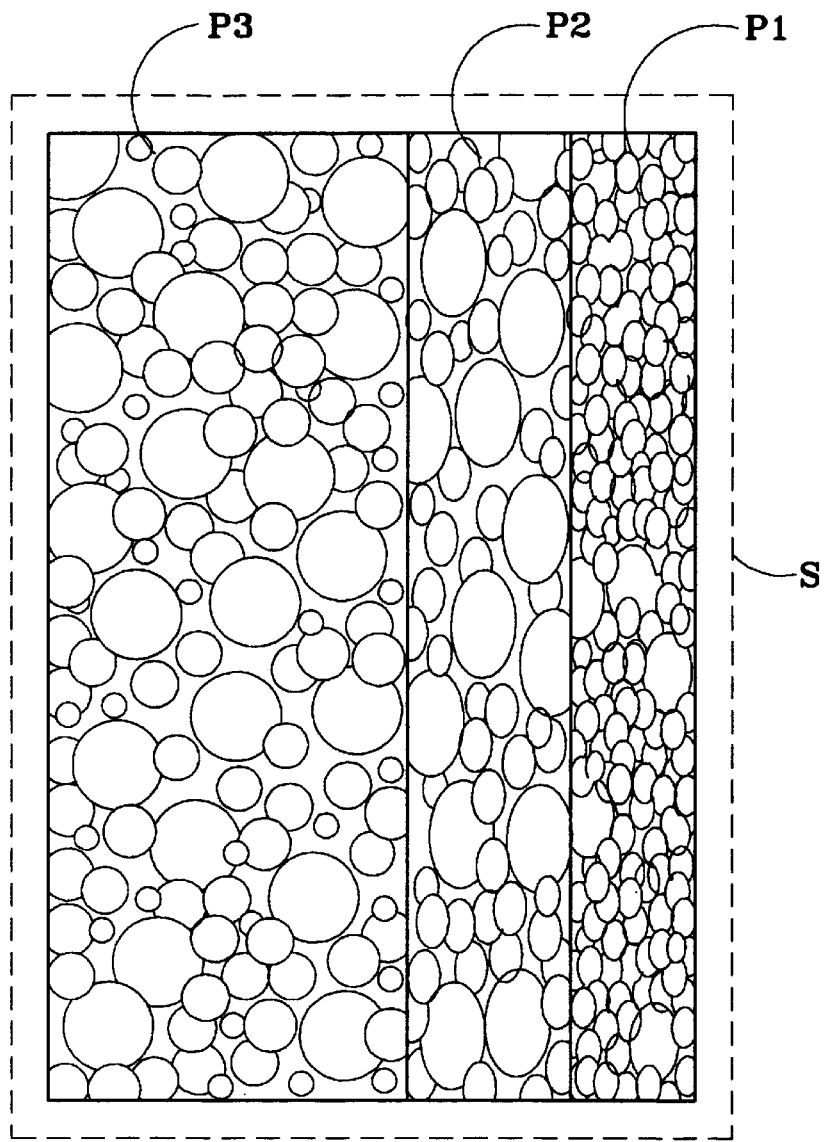
FIG. 14 is an enlarged, schematic view of a section S taken from FIG. 13, showing the three, fused, expanded polystyrene layers thereof (P1—highest density layer; P2—intermediate density layer; P3—back filled, energy absorbing layer).

The second male mold insert 20 and the first male mold insert 18 are then removed from the male half mold 16. The female half mold 14 is again filled with pre-expanded polystyrene beads for remolding the added beads between the female half mold 14 and the male half mold 16 under heat and compression to cause fusion of the added beads at an interface to the expanded bead body to form a backfilled, layered construct 34, here comprising two layers, $l_1$ (high density) and $l_2$ (back fill, low density), as shown in FIG. 14. The backfilled, layered construct 34 is cooled as before and removed from the mold assembly 10. A suitable exterior finish is thereafter applied to the backfilled, layered construct 34 in making the helmet 12. In this manner, a substantially hemispherical construct 34 can be molded without the necessity for first molding individual components thereof (crown, front, back and two sides) and the concomitant necessity thereafter for combining them in an additional molding operation.

Figure 16:
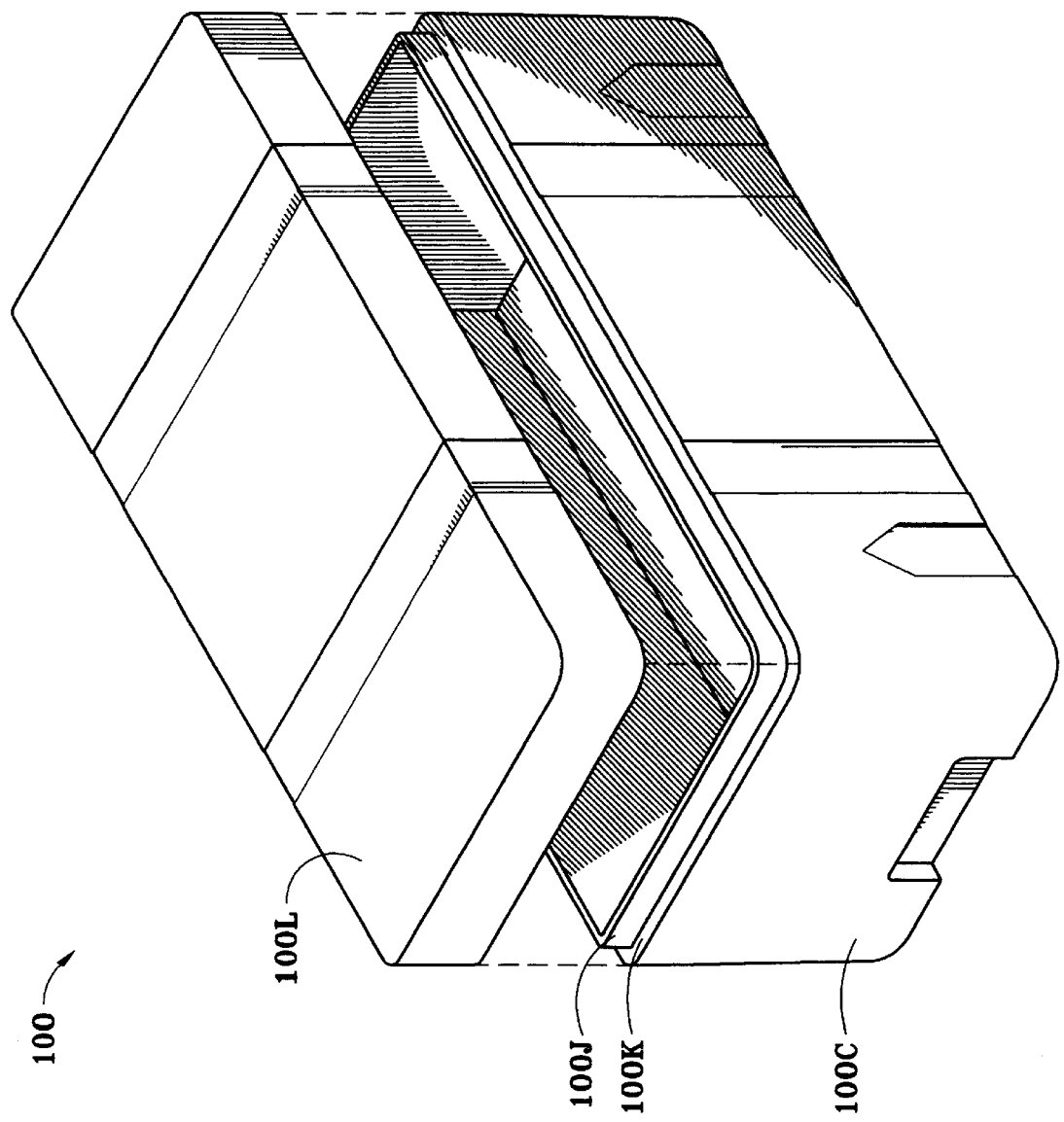
FIG. 16 is a perspective view of an expanded polystyrene packing crate molded by the process described herein.
Figure 17:
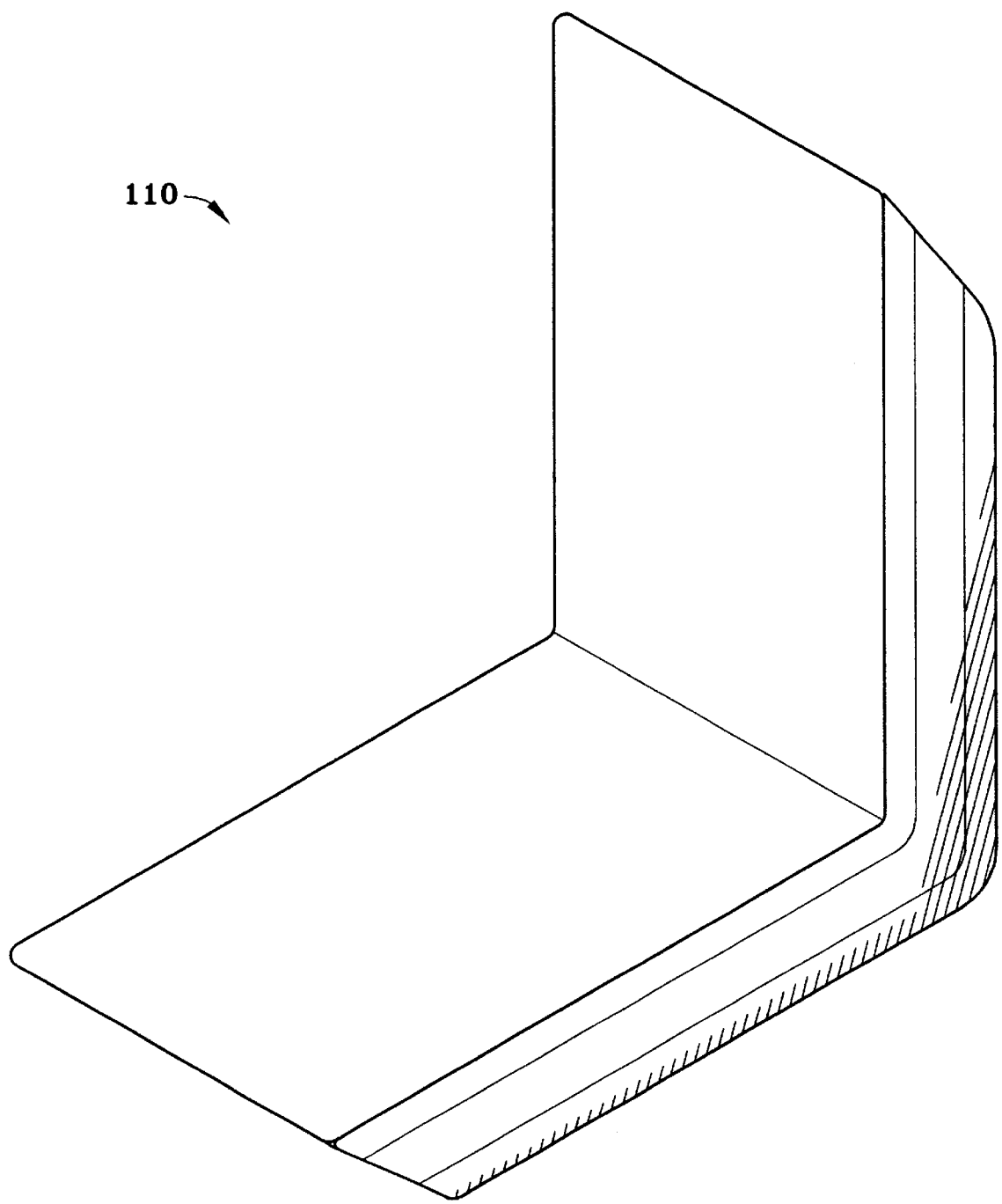
FIG. 17 is a perspective view of an expanded polystyrene edge protector molded by the process described herein.
Figure 18:
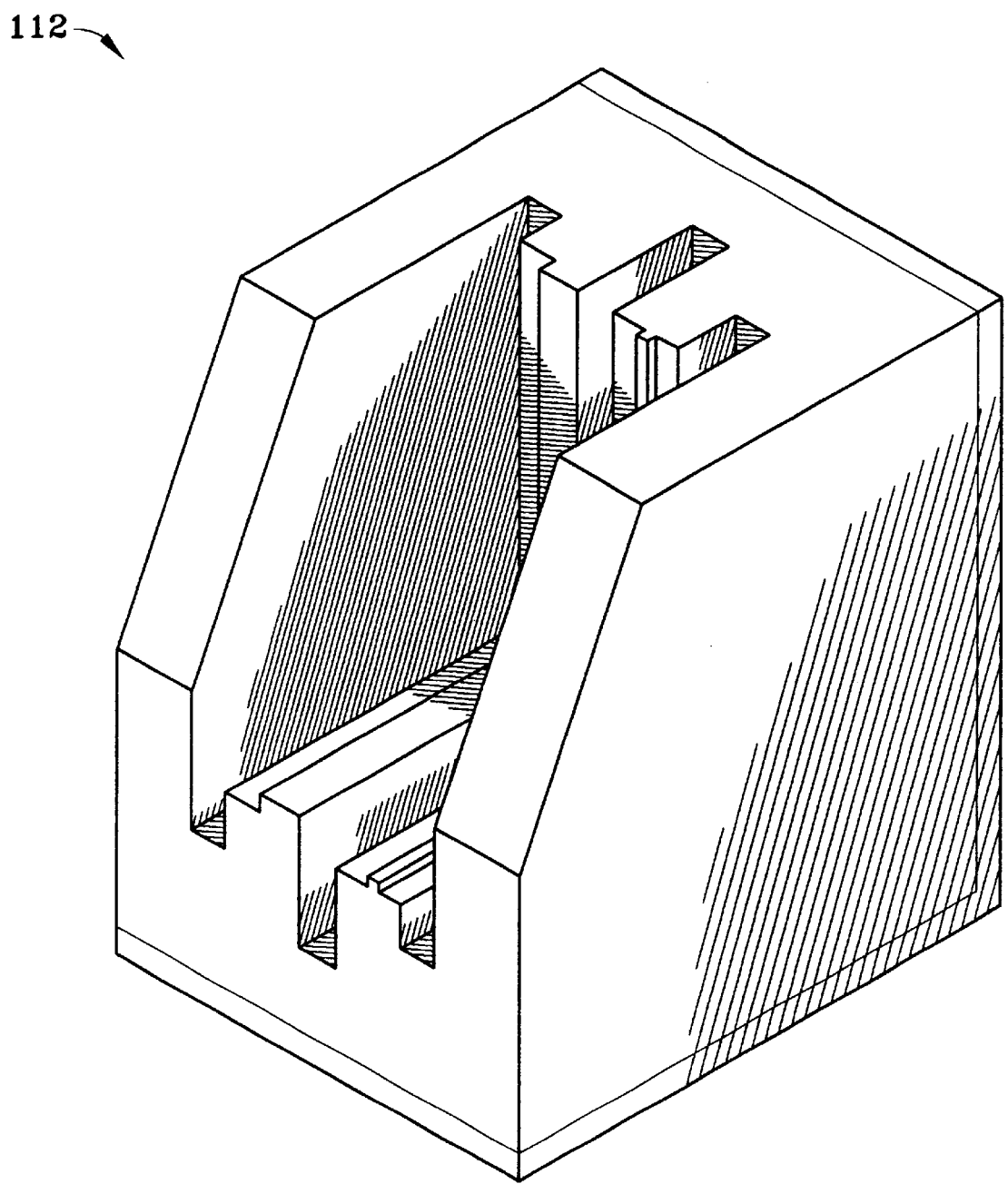
FIG. 18 is a perspective view of an expanded polystyrene corner protector molded by the process described herein.

It will be understood that the above-described process for molding a multilayer polystyrene construct for use in a motorcyclist safety helmet can be adapted to the making of a variety of other objects by appropriate adjustments to the shapes and sizes of the component parts of the mold assembly. Such other objects include, for example, bicyclist safety helmets, packing crates, corner protectors, motor vehicle dashboard components, and, in general, any object in which a sturdy, impact-resistant, expanded polystyrene exterior layer is to be combined with a relatively soft, energy absorbing, interior layer. For example, a a packing crate 100, including a chest 100C and a lid 100L, depicted in FIG. 16, an edge protector 110 (three-layered), useful for shipping furniture, for instance, and depicted in FIG. 17, and a corner protector 112 (two-layered), for protecting a window during shipping and installation, depicted in FIG. 18, were each made according to the above-described process. In the case of the packing crate chest 100C, a high density layer 100K surrounds a low density, back-filled layer 100J.

Moreover, variations on the above-described molding process yield expanded polystyrene constructs having differing characteristics and a wide variety of uses. That is, instead of following all of the foregoing steps of the illustrated embodiment, one can terminate the molding process upon producing the first intermediate product, which is high density, unfixed (i.e., it spontaneously and partially expands somewhat to its original volume), with high memory (i.e., high resistance to being crushed under compression). Such constructs are suitable for molded shape parts for supporting weight, such as as a base under a uni-molded shower stall or a motor vehicle dashboard. The first intermediate product is also useful as acoustical and thermal insulation, wherein high impact resistance is ordinarily not required, but the ability to mold a substantially hemispherical shape by a single, integrated molding process may nevertheless be highly desirable. Alternatively, one can go on to remold the first intermediate product, which yields a high density, fixed construct with low memory. Such a construct is suitable for molded shape parts that 778require great structural strength; examples include surf board cores and industrial in-line assembly trays. One can proceed further to back fill the contruct, yielding a combination high density layer and back-filled low density layer; such constructs are suitable for energy-absorbing molded shape parts, such as motorcyle safety helmet liners and corner pads. One can proceed still farther to produce a combination high density, fixed layer with a back-filled, low density layer; such constructs are suitable, for example, for bicycle safety helmets, box-less clamshell packaging, and for the energy-absorbing component of a DRIVET® system for stucco-covered wall construction. Thus, while the preferred embodiment of the invention has been illustrated and described, it is accordingly intended that the disclosure be taken as illustrative only and not limiting in scope, and that the scope of the invention be defined by the following claims.

I claim:

1. A process for molding an expanded polystyrene bead construct within a mold assembly, said mold assembly including a female half mold having a first, continuous, peripheral edge surface and an interior surface configured to impart a desired exterior surface to the construct, a male half mold having a second, peripheral edge surface in mating alignment with the first peripheral edge surface when the female half mold and the male half mold are aligned on an alignment axis, a first male mold insert mountable on the male half mold and having a third, beveled, continuous peripheral edge surface, the female half mold and the first male mold defining a first volume therebetween when the first male mold is inserted into the female half mold, and a second male mold insert mountable on the first male mold insert, the female half mold and the second male mold insert defining a second, reduced volume therebetween when the second male mold insert is inserted into the female half mold, the process comprising:

(a) filling the female half mold with pre-expanded polystyrene beads of a predetermined density;

(b) mounting the first male mold insert on the male half mold;

(c) molding the beads under applied heat and pressure by forcing the first male mold insert against the beads to fuse the beads together to form a first intermediate product of a first volume having a continuous, beveled edge surface formed between the beveled edge surface of the first male mold insert and the peripheral edge surface of the female half mold;

(d) rapidly cooling the fused first intermediate product to within a subplasticizing temperature range to cause lower than atmospheric pressure within the beads of the first intermediate product;

(e) mounting the second male mold insert on the first male mold insert; and (f) compressing the cooled first intermediate product between the second male mold insert and the female half mold to a second, reduced volume before the low pressure conditions within the beads equilibrate to ambient conditions to produce a fused expanded bead body of at least 200 percent higher density than the predetermined density of the pre-expanded beads.

2. A process for molding an expanded polystyrene bead construct within a mold assembly, said mold assembly including a female half mold having a first, continuous, peripheral edge surface and an interior surface configured to impart a desired exterior surface to the construct, a male half mold having a second, peripheral edge surface in mating alignment with the first peripheral edge surface when the female half mold and the male half mold are aligned on an alignment axis, a first male mold insert mountable on the male half mold and having a third, beveled, continuous peripheral edge surface, the female half mold and the first male mold defining a first volume therebetween when the first male mold is inserted into the female half mold, and a second male mold insert mountable on the first male mold insert, the female half mold and the second male mold insert defining a second, reduced volume therebetween when the second male mold insert is inserted into the female half mold, the process comprising:

(a) filling the female half mold with pre-expanded polystyrene beads of a predetermined density;

(b) mounting the first male mold insert on the male half mold;

(c) molding the beads under applied heat and pressure by forcing the first male mold insert against the beads to fuse the beads together to form a first intermediate product of a first volume having a continuous, beveled edge surface formed between the beveled edge surface of the first male mold insert and the peripheral surface of the female half mold;

(d) rapidly cooling the fused first intermediate product to within a subplasticizing temperature range to cause lower than atmospheric conditions within the beads of the first intermediate product;

(e) mounting the second male mold insert on the first male mold insert;

(f) compressing the cooled first intermediate product between the second male mold insert and the female half mold to a second, reduced volume before the low pressure conditions within the beads equilibrate to ambient conditions to produce a fused expanded bead body of at least 200 percent higher density than the predetermined density of the pre-expanded beads; and (g) remolding the cooled intermediate product under heat and compression between the second male mold insert and the female half mold to a second, reduced volume before the low pressure conditions within the beads equilibrate to ambient conditions to produce a fused expanded bead body of at least 200 percent higher density than the predetermined density of the pre-expanded beads.

3. A process for molding a layered, expanded polystyrene bead construct within a mold assembly, said mold assembly including a female half mold having a first, continuous, peripheral edge surface and an interior surface configured to impart a desired exterior surface to the construct, a male half mold having a second, peripheral edge surface in mating alignment with the first peripheral edge surface when the female half mold and the male half mold are aligned on an alignment axis, the male half mold having an exterior surface configured to impart a desired interior surface to the construct, a first male mold insert mountable on the male half mold and having a third, beveled, continuous peripheral edge surface, the female half mold and the first male mold defining a first volume therebetween when the first male mold is inserted into the female half mold, and a second male mold insert mountable on the male half mold, the female half mold and the second male mold insert defining a second, reduced volume therebetween when the second male mold insert is inserted into the female half mold, the process comprising:

(a) filling the female half mold with pre-expanded polystyrene beads of a predetermined density;

(b) mounting the first male mold insert on the male half mold;

(c) molding the beads under applied heat and pressure by forcing the first male mold insert against the beads to fuse the beads together to form a first intermediate product of a first volume having a continuous, beveled edge surface formed between the beveled edge surface of the first male mold insert and the peripheral surface of the female half mold;

(d) rapidly cooling the fused first intermediate product to within a subplasticizing temperature range to cause lower than atmospheric conditions within the beads of the first intermediate product;

(e) mounting the second male mold insert on the first male mold insert;

(f) compressing the cooled first intermediate product between the second male mold insert and the female half mold to a second, reduced volume before the low pressure conditions within the beads equilibrate to ambient conditions to produce a fused expanded bead body of at least 200 percent higher density than the predetermined density of the pre-expanded beads;

(g) removing the second male mold insert and the first male mold insert from the male half mold; and (h) adding pre-expanded polystyrene beads to the mold assembly and remolding the added beads between the female half mold and the male half mold under heat and compression to cause fusion of the added beads at an interface to the expanded bead body to form a layered construct comprising at least two layers of beads wherein the layers have different densities.

4. A process for molding a layered expanded polystyrene bead construct within a mold assembly, said mold assembly including a female half mold having a first, continuous, peripheral edge surface and an interior surface configured to impart a desired exterior surface to the construct, a male half mold having a second, peripheral edge surface in mating alignment with the first peripheral edge surface when the female half mold and the male half mold are aligned on an alignment axis, the male half mold having an exterior surface configured to impart a desired interior surface to the construct, a first male mold insert mountable on the male half mold and having a third, beveled, continuous peripheral edge surface, the female half mold and the first male mold defining a first volume therebetween when the first male mold is inserted into the female half mold, and a second male mold insert mountable on the male half mold, the female half mold and the second male mold insert defining a second, reduced volume therebetween when the second male mold insert is inserted into the female half mold, the process comprising:

(a) filling the female half mold with pre-expanded polystyrene beads of a predetermined density;

(b) mounting the first male mold insert on the male half mold;

(c) molding the beads under applied heat and pressure by forcing the first male mold insert against the beads to fuse the beads together to form a first intermediate product of a first volume having a continuous, beveled edge surface formed between the beveled edge surface of the first male mold insert and the peripheral surface of the female half mold;

(d) rapidly cooling the fused first intermediate product to within a subplasticizing temperature range to cause lower than atmospheric conditions within the beads of the first intermediate product;

(e) mounting the second male mold insert on the first male mold insert;

(f) compressing the cooled first intermediate product between the second male mold insert and the female half mold to a second, reduced volume before the low pressure conditions within the beads equilibrate to ambient conditions to produce a fused expanded bead body of at least 200 percent higher density than the predetermined density of the pre-expanded beads;

(g) remolding the cooled intermediate product under heat and compression between the second male mold insert and the female half mold to a second, reduced volume before the low pressure conditions within the beads equilibrate to ambient conditions to produce a fused expanded bead body of at least 200 percent higher density than the predetermined density of the pre-expanded beads;

(h) removing the second male mold insert from the first male mold insert; and (i) adding pre-expanded polystyrene beads to the mold assembly and remolding the added beads between the female half mold and the male half mold under heat and compression to cause fusion of the added beads at an interface to the expanded bead body to form a layered construct comprising at least two layers of beads wherein the layers have different densities.

5. The process of claim 1, 2, 3, or 4, wherein the beveled edge surface of the first male mold insert is deviated at least 45 degrees, but not more than 60 degrees, from a mold parting line normal to the alignment axis.

* * * * *